Aug. 14, 1923.

1,464,850

M. MERRITT

POULTRY TAG FOR TRAP NESTS

Filed Aug. 18, 1922

Merton Merritt
INVENTOR.

BY

Parsons & Bodell
ATTORNEYS.

Patented Aug. 14, 1923.

1,464,850

UNITED STATES PATENT OFFICE.

MERTON MERRITT, OF SYRACUSE, NEW YORK.

POULTRY TAG FOR TRAP NESTS.

Application filed August 18, 1922. Serial No. 582,674.

*To all whom it may concern:*

Be it known that I, MERTON MERRITT, a citizen of the United States, and a resident of Syracuse, in the county of Onondaga and State of New York, have invented a certain new and useful Poultry Tag for Trap Nests, of which the following is a specification.

This invention has for its object means for tagging or identifying the hen or other fowl laying an egg in a trap nest without trapping the hen permanently in the nest, or in other words, permitting the hen to leave the nest after she has laid the egg and identifying the hen and closing the nest.

The invention consists in the novel features and in the combinations and constructions hereinafter set forth and claimed.

In describing this invention, reference is had to the accompanying drawings, in which like characters designate corresponding parts in all the views.

1 designates the nest which may be of any suitable form, size and construction, it being here shown as a box having its front end open and provided with a gate 2.

Figure 1:
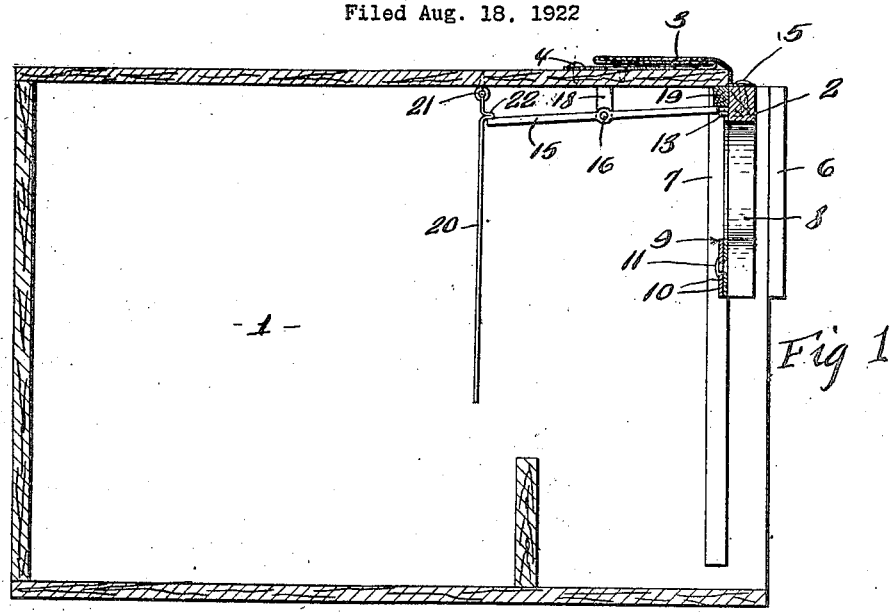
Figure 1 is a longitudinal sectional view of the nest showing the tag attached to the gate thereof.
Figures 2, 3:
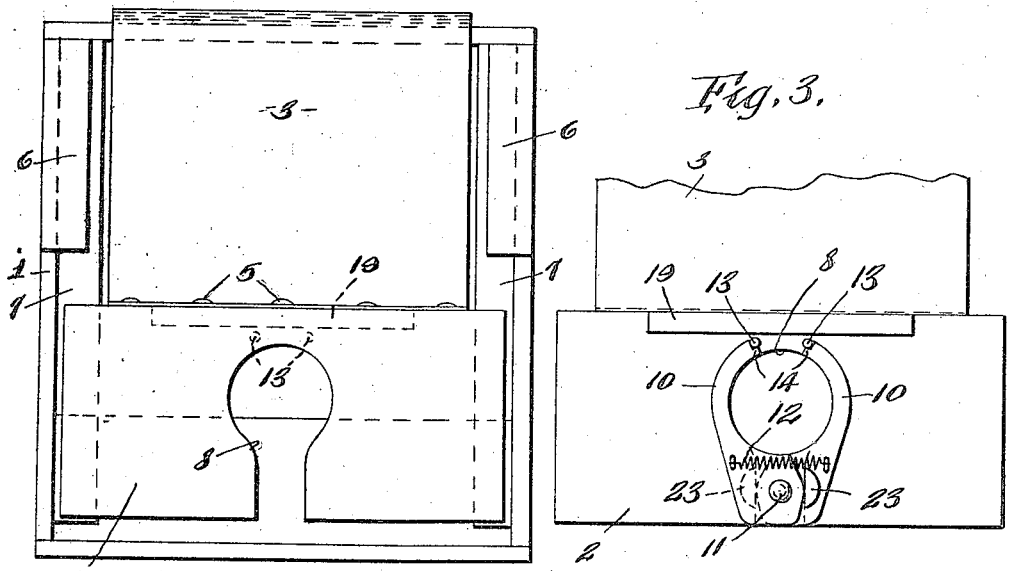
Figure 2 is a front elevation of the nest, the gate being shown in its closed position.
Figure 3 is a fragmentary rear elevation of the gate showing the tag attached thereto.

The gate is mounted to move vertically from its open to its closed position and to swing outwardly when in its lower or closed position to permit the hen to leave the nest, but is prevented from inward movement to prevent another hen from entering the same nest until the gate 2 has been reset in its open position. The gate 2 is here shown as provided with a flexible support, as a curtain or strip of fabric 3, which support is secured at 4 to the top of the box and at 5 to the upper end of the gate, the gate sliding vertically in front and rear guides 6, 7, the rear guides extending substantially the full depth of the box in order to prevent the inward swinging movement of the gate when in its lower position, as shown in Figure 2 and the front guide 6 extending from the top of the box, but part way toward the bottom and terminating above the upper edge of the gate 2 when the gate is in its lowermost position, in order to permit outward swinging of the gate. The gate 2 is formed with a slot or passage 8 opening through its lower edge and extending upwardly toward the top edge of the gate, but terminating short of the top edge, the upper portion of this slot 8 being preferably larger than the lower portion and also preferably circular in form.

9 designates the tag, which is in the form of a split collar composed of opposing sections 10 connected together at like ends to have a pivotal movement toward and from each other and having their other ends separable, these sections being spring-pressed toward each other. Preferably, the sections 10 are flat plates hinged together at 11 and connected by a tension spring 12 and the space enclosed by the collar is circular in form to conform to the upper circular portion of the slot 8, the gate is provided preferably on the inner side thereof with spaced apart shoulders 13 located adjacent the enlargement portion of the slot 8 and preferably directly above the slot 8, these shoulders engaging the ends of the sections 10 and holding them separated and against the tension of the spring 12. The ends of the sections 10 are preferably notched as at 14, to facilitate the frictional engagement thereof, with the shoulders 13. The gate 2 is held in its elevated position or its position shown in Figure 2, by a suitable mechanism which is tripped by the fowl when entering the nest and as here shown, this mechanism comprises a lever 15 pivoted between its ends at 16 to the top or to the nest or bracket 18 depending from the top of the case, one end of the lever engaging under a shoulder 19 on the rear side of the gate 2 and the other end coacting with the trigger 20 pivoted at 21 to the top of the case and having a catch 22 engaging the opposite end of the lever 15.

In operation, the hen enters the nest under the gate 2 and as she passes into the nest, engages the trigger 20 releasing the lever 15 and permitting the gate 2 to fall by gravity into the position shown in Figure 2.

After the hen has laid the egg, in order to get out of the nest, she enters her head through the enlarged portion of the slot 8 and hence through the collar or between the separated arms 10 thereof and in walking out of the nest causes the gate to swing outwardly. As she progresses her neck engages the closed portion of the collar and pulls the sections out of engagement with the shoulders 13, these sections being held by frictional engagement with the shoulders and the spring 12 brings the sections toward each other, thus attaching the collar on the neck of the fowl. During further progress, the neck of the hen passes through a narrow portion of the slot 8.

Means as shoulders 23 are provided for limiting the movement of the sections toward each other by the spring 12 so that the collar will not fit tightly on the neck of the hen.

As each tag is numbered, or otherwise identified, with a number corresponding to the nest on which it is placed, it can be readily determined by the tag which hen laid the egg in a particular nest. Thus, a selection for breeding or other purposes can be readily made.

What I claim is:

1. The combination with a trap nest having a gate, means for closing the gate when the fowl enters the nest, the gate being movable outwardly from closed position and means for preventing movement of the gate inwardly, the gate having an upright slot opening through its lower edge and shoulders spaced apart adjacent the slot, of a tag in the form of a collar comprising opposing spring-pressed sections connected together at like ends to have a pivotal movement and their other ends arranged to be separated and to engage the spaced apart shoulders with the opening enclosed by the collar alined with the slot, substantially as and for the purpose described.

2. The combination with a trap nest having a gate, means for closing the gate when the fowl enters the nest, the gate being movable outwardly from closed position and means for preventing inward movement thereof, the gate having an upright slot opening through its lower edge and spaced apart shoulders above the upper end of the slot, of a tag in the form of a collar comprising opposite spring-pressed sections connected at like ends to have a pivotal movement and having their other ends arranged to engage the spaced apart shoulders, substantially as and for the purpose specified.

3. The combination with a trap nest having a gate, means for closing the gate when the fowl enters the nest, the gate being movable outwardly from closed position and means for preventing movement of the gate inwardly, the gate having an upright slot opening through its lower edge and shoulders spaced apart adjacent the slot, of a tag in the form of a collar comprising opposing spring-pressed sections connected together at like ends to have a pivotal movement and their other ends arranged to be separated and to engage the spaced apart shoulders with the opening enclosed by the collar alined with the slot, and means for limiting the movement of the sections of the collar toward each other by the spring, substantially as and for the purpose set forth.

4. A trap nest comprising a box having a vertically movable gate, flexible means supporting the gate and permitting it to swing outwardly when in its lower or closed position, the box having guides for the gate arranged to prevent inward swinging of the gate, the gate having a passage for the head and neck of the hen, and a tag detachably supported on the gate and having an opening alined with the slot of the gate, substantially as and for the purpose described.

5. The combination with a trap nest having an outwardly swinging gate, means for closing the gate when the fowl enters the nest, the gate being movable outwardly from closed position, and means for preventing movement of the gate inwardly from closed position, the gate having a slot opening through its free edge and shoulders spaced apart adjacent the slot, of a tag in the form of a split collar comprising opposing spring actuated sections, and having the arms thereof arranged to separate to engage said spaced apart shoulders with the opening enclosed by the collar alined with the slot and the portion of the split collar opposite the separated ends of the arms of said split collar extending across the slot.

In testimony whereof, I have hereunto signed my name, at Syracuse, in the county of Onondaga, and State of New York, this 15th day of August, 1922.

MERTON MERRITT.